BALED HAY STACKER, CARRIER AND DELIVERY APPARATUS

Original Filed Dec. 3, 1962 12 Sheets-Sheet 1

INVENTOR
HOWARD R. STROUP

BY W. Britton Moore
ATTORNEY

BALED HAY STACKER, CARRIER AND DELIVERY APPARATUS

Original Filed Dec. 3, 1962 12 Sheets-Sheet 2

INVENTOR
HOWARD R. STROUP

BY W. Britton Moore
ATTORNEY

BALED HAY STACKER, CARRIER AND DELIVERY APPARATUS

Original Filed Dec. 3, 1962 12 Sheets-Sheet 3

INVENTOR
HOWARD R. STROUP

BY

ATTORNEY

BALED HAY STACKER, CARRIER AND DELIVERY APPARATUS

Original Filed Dec. 3, 1962 12 Sheets-Sheet 4

INVENTOR
HOWARD R. STROUP

BY

ATTORNEY

BALED HAY STACKER, CARRIER AND DELIVERY APPARATUS

Original Filed Dec. 3, 1962 12 Sheets-Sheet 5

INVENTOR
HOWARD R. STROUP

BY

ATTORNEY

BALED HAY STACKER, CARRIER AND DELIVERY APPARATUS

Original Filed Dec. 3, 1962 12 Sheets-Sheet 6

INVENTOR
HOWARD R. STROUP

BY W. Britton Moore
ATTORNEY

BALED HAY STACKER, CARRIER AND DELIVERY APPARATUS

Original Filed Dec. 3, 1962 12 Sheets-Sheet 7

INVENTOR
HOWARD R. STROUP

BY W. Britton Moore
ATTORNEY

BALED HAY STACKER, CARRIER AND DELIVERY APPARATUS

Original Filed Dec. 3, 1962 12 Sheets-Sheet 8

INVENTOR
HOWARD R. STROUP

BY W. Britton Moore
ATTORNEY

BALED HAY STACKER, CARRIER AND DELIVERY APPARATUS

Original Filed Dec. 5, 1962 12 Sheets-Sheet 5

INVENTOR
HOWARD R. STROUP

W. Griffith Moore
ATTORNEY

BALED HAY STACKER, CARRIER AND DELIVERY APPARATUS

Original Filed Dec. 7, 1962 12 Sheets-Sheet 10

INVENTOR
HOWARD R. STROUP

BY

ATTORNEY

BALED HAY STACKER, CARRIER AND DELIVERY APPARATUS

Original Filed Dec. 5, 1962 12 Sheets-Sheet 11

INVENTOR
HOWARD R. STROUP

BY

ATTORNEY

BALED HAY STACKER, CARRIER AND DELIVERY APPARATUS

Original Filed Dec. 3, 1962 12 Sheets-Sheet 12

INVENTOR
HOWARD R. STROUP

BY

ATTORNEY

United States Patent Office

Re. 26,478
Reissued Oct. 22, 1968

26,478
BALED HAY STACKER, CARRIER AND DELIVERY APPARATUS

Howard R. Stroup, Rte. 1, Box 71,
Artesia, N. Mex. 88210

Original No. 3,159,287, dated Dec. 1, 1964, Ser. No. 241,929, Dec. 3, 1962. Application for reissue Mar. 18, 1966, Ser. No. 538,146
16 Claims. (Cl. 214—6)

Matter enclosed in heavy brackets [ ] appears in the original patent but forms no part of this reissue specification; matter printed in italics indicates the additions made by reissue.

*ABSTRACT OF THE DISCLOSURE*

*Mobile apparatus for accumulating and stacking bales having a bale carrying platform, means to receive individual bales and build a vertical stack of individual bales from the bottom up, and means to accumulate a plurality of said vertical bale stacks on said platform for discharge in the form of a larger stack several bales high.*

Figure 1:
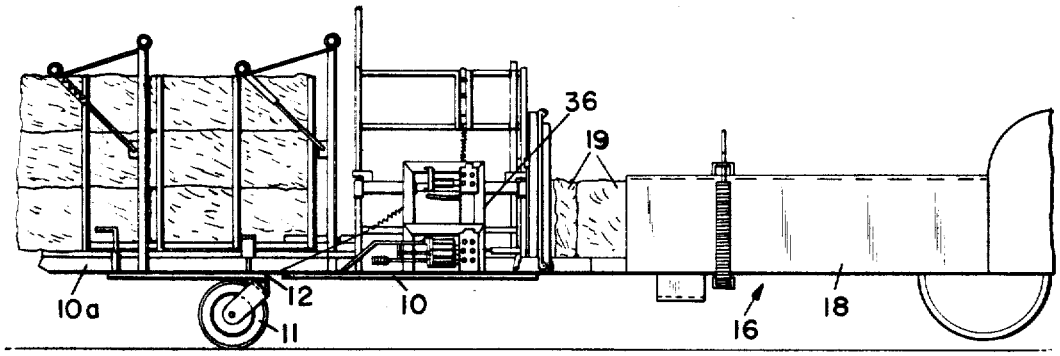

The present invention relates to a baled hay stacker, carrier and delivering apparatus and it consists in the combinations, constructions and arrangements of parts herein described and claimed.

Generally there is provided an apparatus comprising a trailer type wheel supported vehicle having a platform and, in the rear portion thereof, a rearwardly tiltable bed. The vehicle is adapted to be hitched to a hay baling machine which may be either self propelled or drawn by a tractor and means is provided for delivering each bale as it is produced by the baler to a stacking chamber on the forward portion of the platform. As the first bale is delivered to the stacking chamber, automatic mechanism comes into action to elevate the bale in the chamber until the same is automatically latched in such elevated position. The next bale entering the stacking chamber is likewise automatically lifted and bears against the underside of the first bale thereby lifting the first bale to a higher position in the chamber and allowing the automatic latching means to now hold both the first and second bales in elevated position. When a third bale comes into the chamber from the baler, automatic means operate to move rearwardly the three thus vertically arranged bales as a single stack onto one side of the forward portion of the tiltable bed. As bales continue to be received in the stacking chamber, each consecutive three bales would be assembled into a stack and moved rearwardly as aforesaid. Each new stack of three bales thus delivered to the tiltable bed will move the stack previously delivered to the tiltable bed in a rearward direction until, in the apparatus as herein described, two such stacks have been assembled. Then this occurs, automatic means moves the thus assembled row of two stacks laterally upon the tiltable bed. This procedure is repeated until four such rows, in the embodiment herein shown, have been assembled whereupon a latch is automatically released allowing the tiltable bed to tilt rearwardly by gravity due to the weight of the thus assembled bales thereon thus discharging the assembled bales in their stacked condition upon the ground. Various novel automatically actuated hydraulically operated mechanisms form parts of the invention.

It is accordingly an object of the invention to provide an apparatus of the character set forth having novel means for automatically stacking bales of hay.

Another object of the invention is the provision, in an apparatus of the character set forth, of novel means for automatically assembling stacks of bales in a row of stacks.

A further object of the invention is the provision, in an apparatus of the character set forth, of novel means for automatically assembling rows of stacks of bales in laterally registering condition.

Still another object of the invention is to provide a novel apparatus for automatically stacking bales, automatically assembling said stacks of bales in rows, automatically assembling said rows in laterally registering condition, and automatically delivering said assembled rows of stacks to the ground.

Another object of the invention is to provide, in an apparatus of the character set forth, novel automatically actuated hydraulically operated means for moving the essential movable parts of said appartus.

Another object of the invention is the provision, in an apparatus of the character set forth, of a novel bale stacking mechanism forming a part of the invention.

Still another object of the invention is the provision ,in an apparatus of the character set forth, of a bale stacking mechanism having novel means for maintaining certain bales in elevated position while new bales are admitted therebeneath for vertical stacking.

A still further object of the invention is the provision, in an apparatus of the character set forth, of novel overcentre valve operating devices forming parts of the invention.

Figure 2:
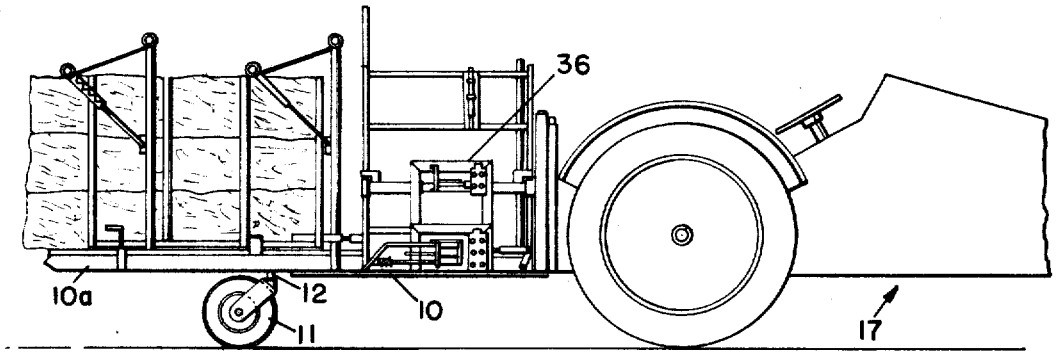
Figure 3:
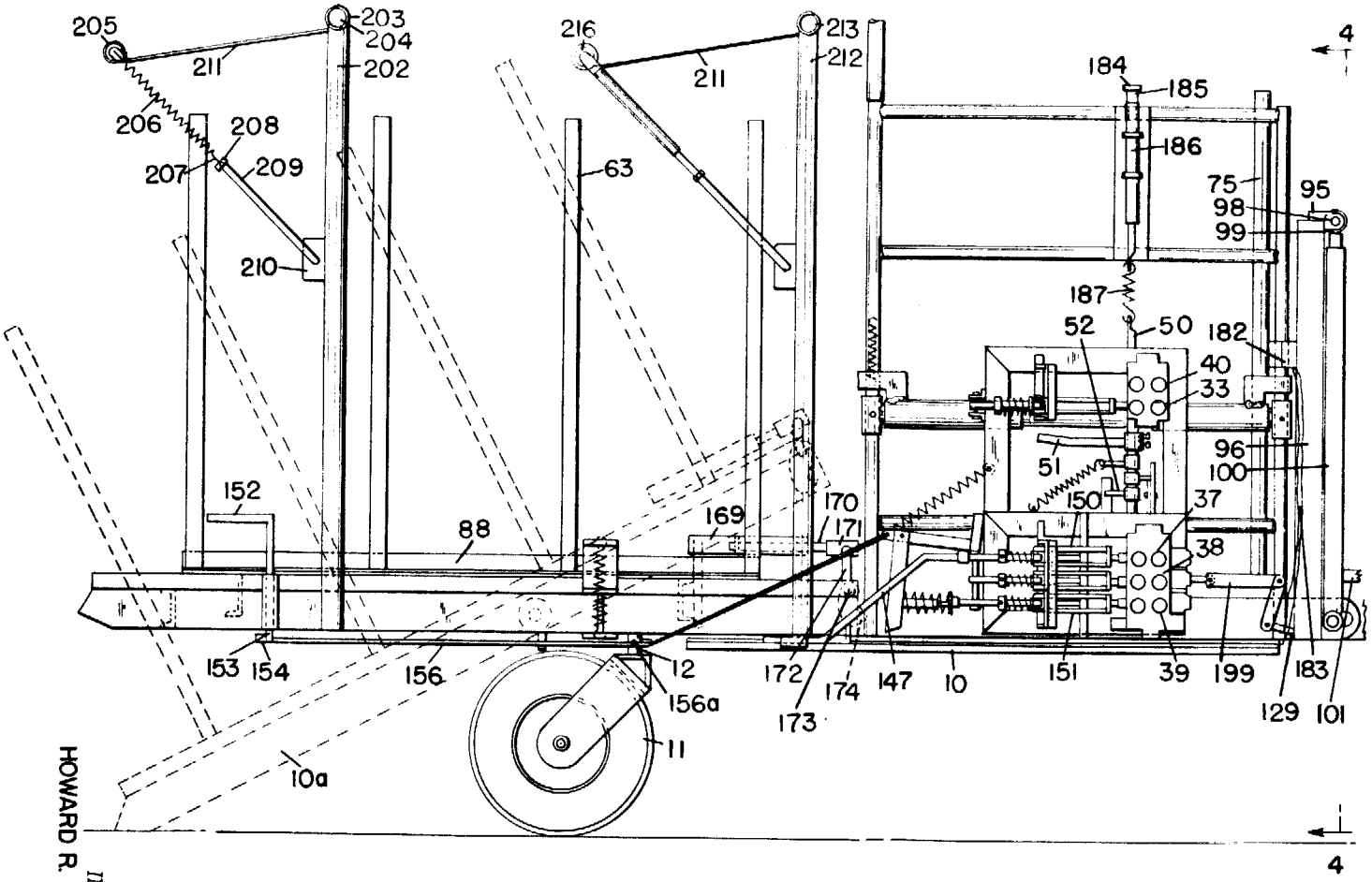
Figure 4:
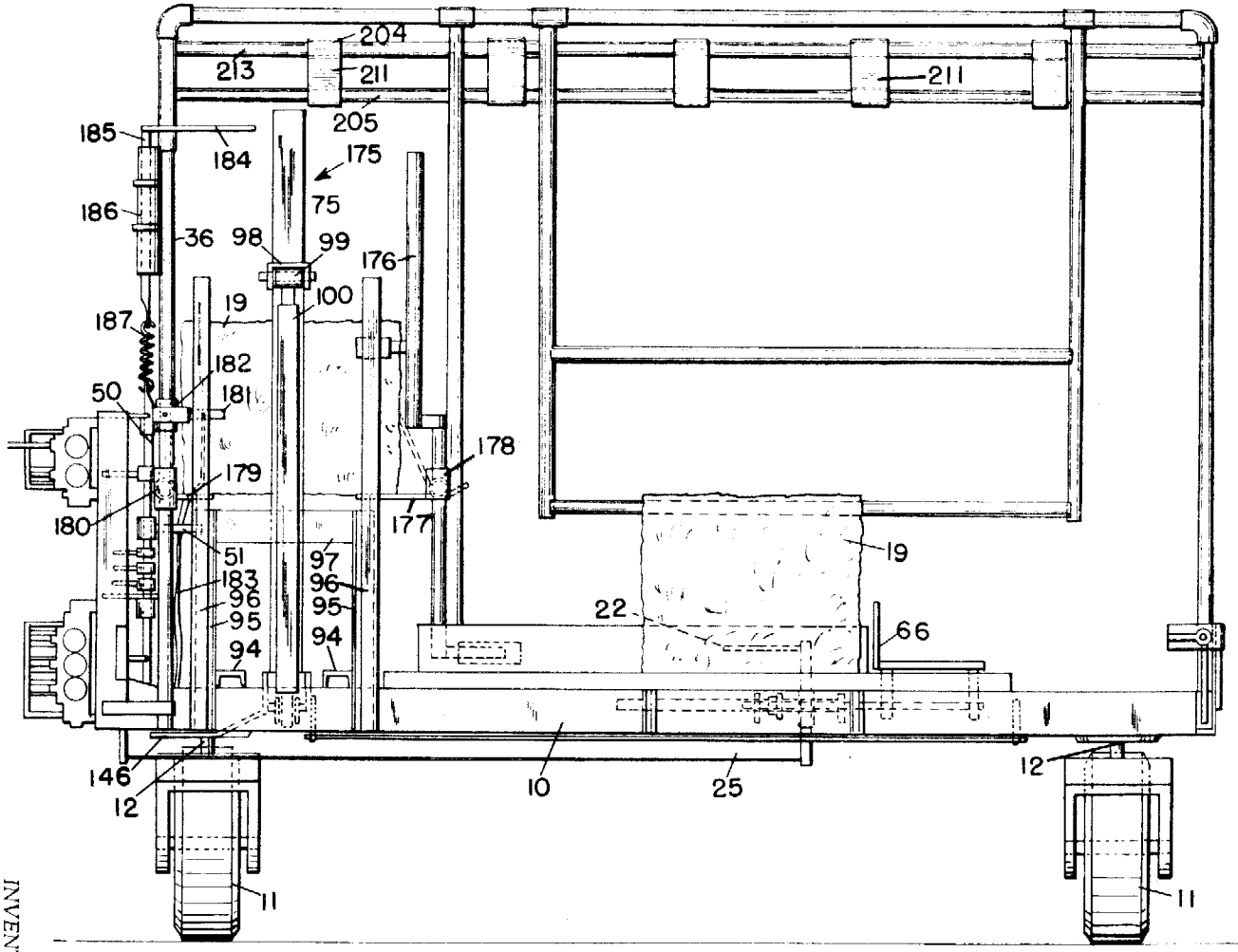
Figure 5:
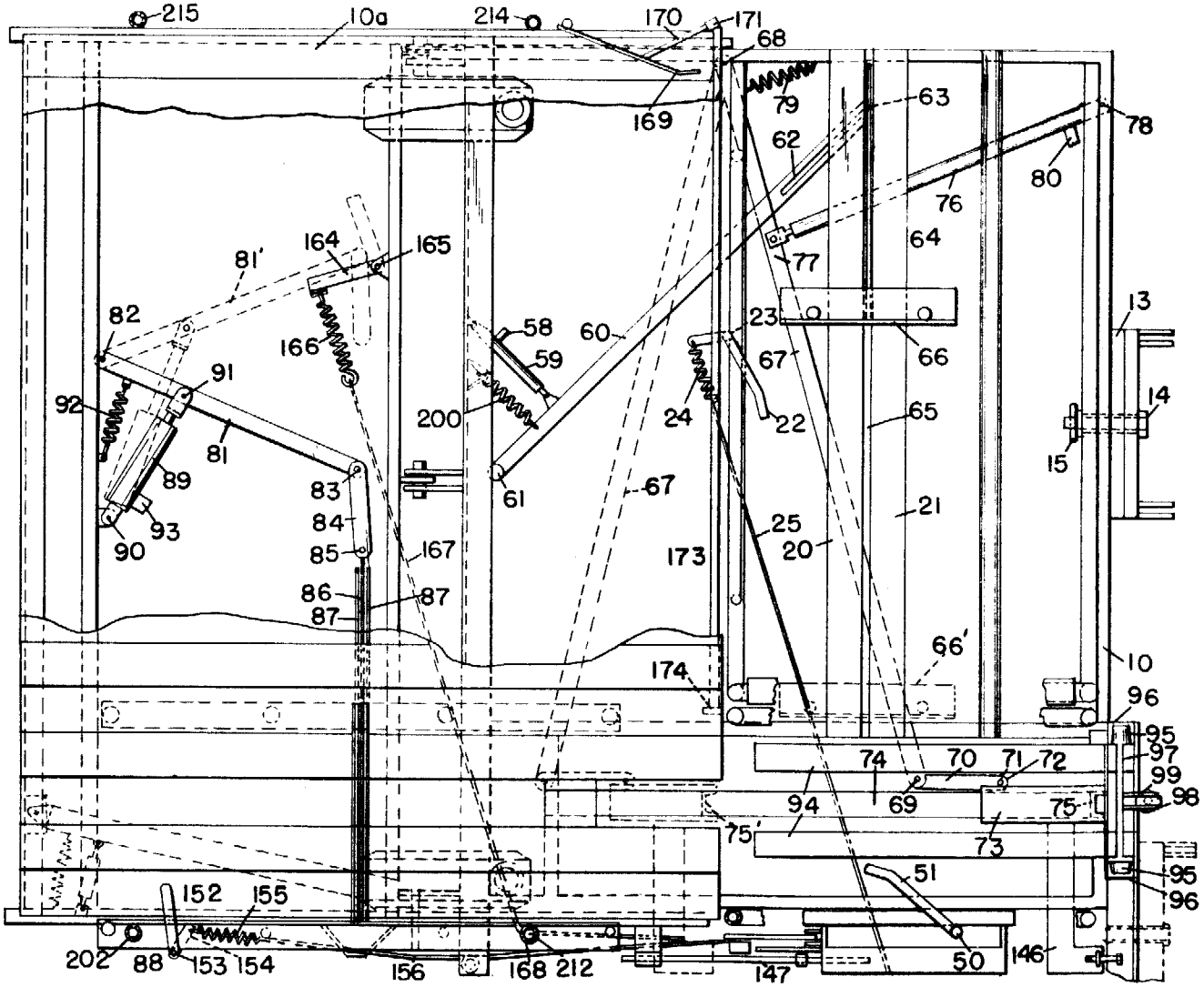
Figure 6:
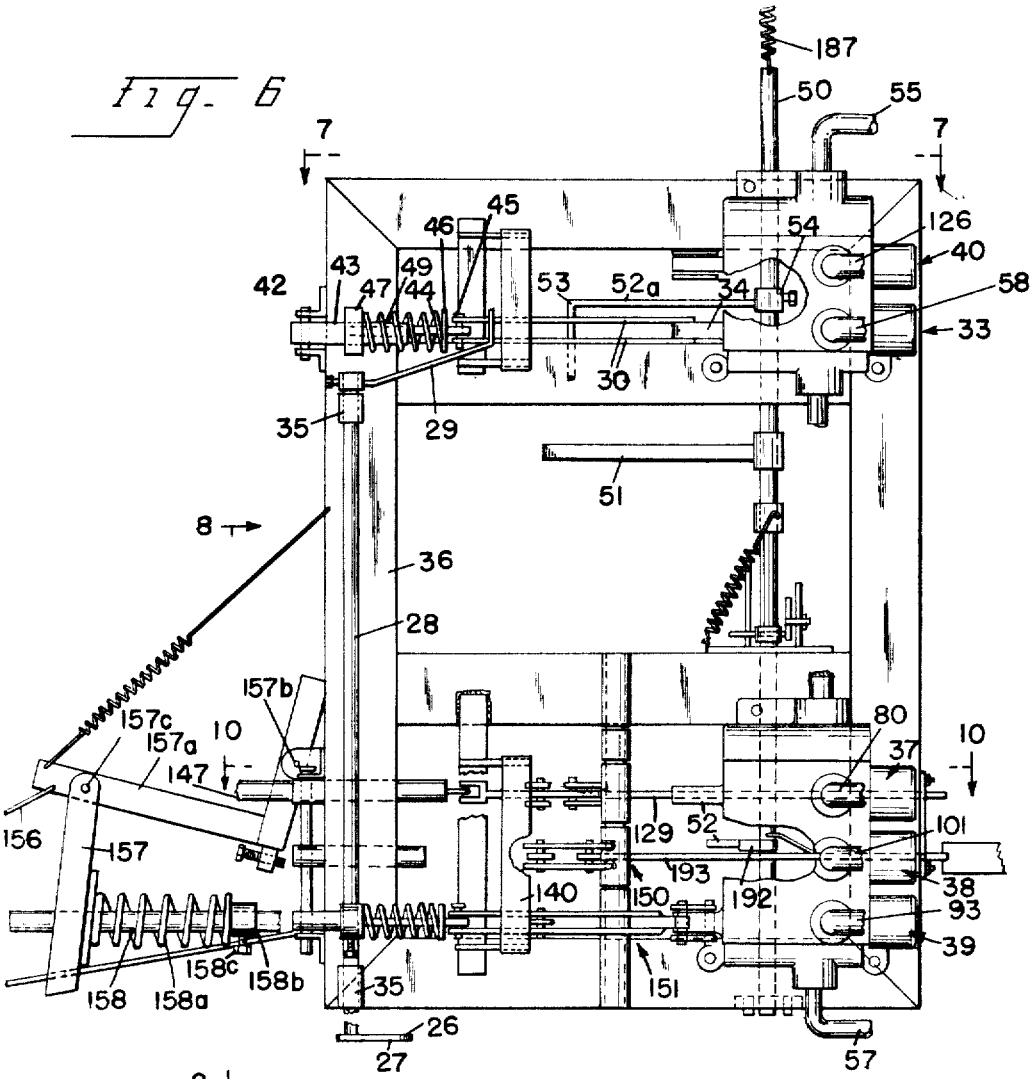
Figure 7:
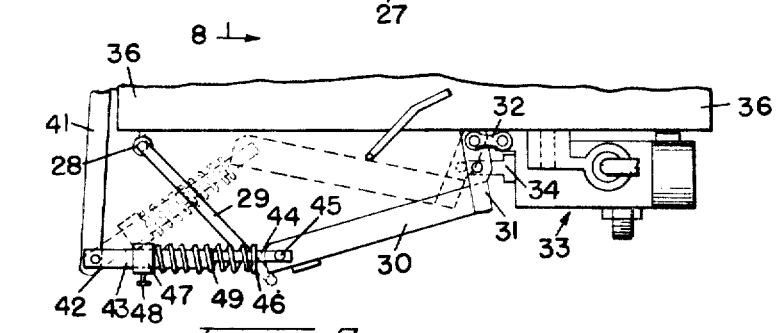
Figure 8:
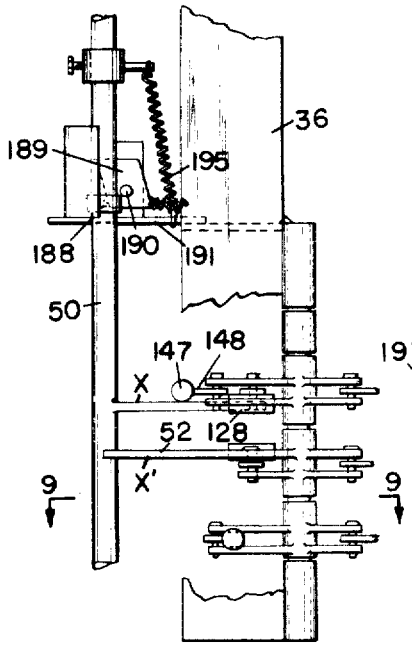
Figure 10A:
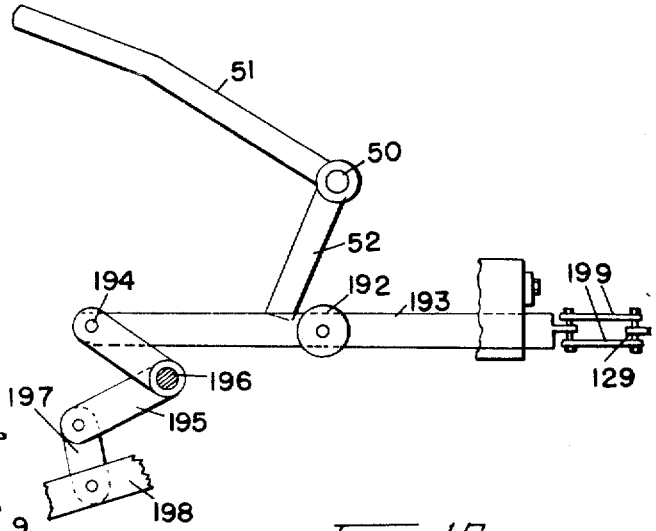
Figure 9:
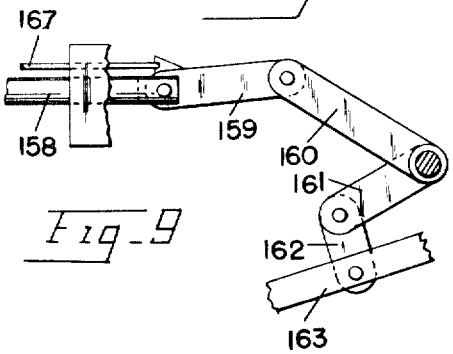
Figure 10:
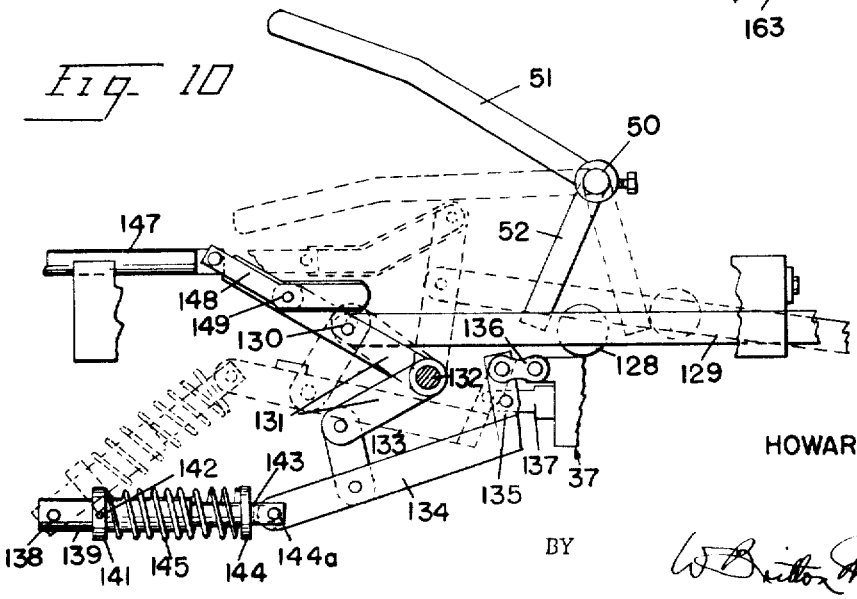
Figure 11:
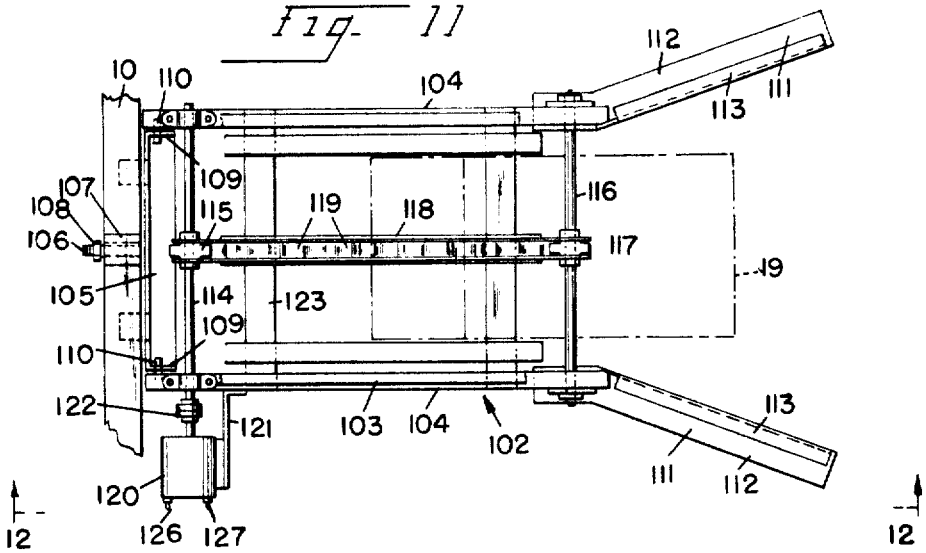
Figure 12:
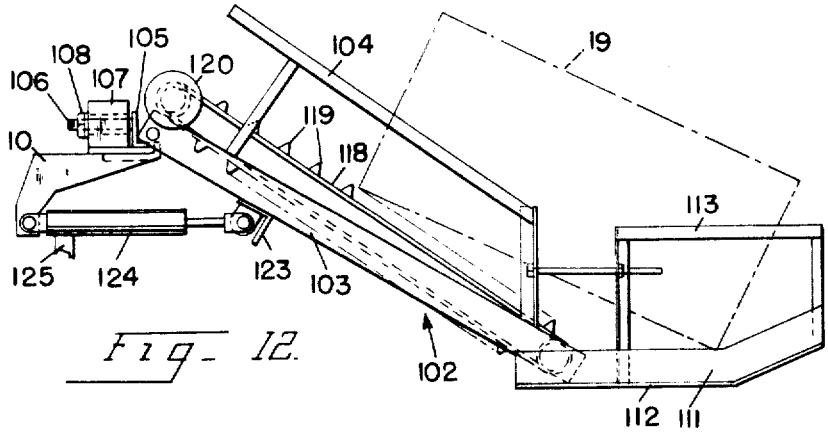
Figure 13:
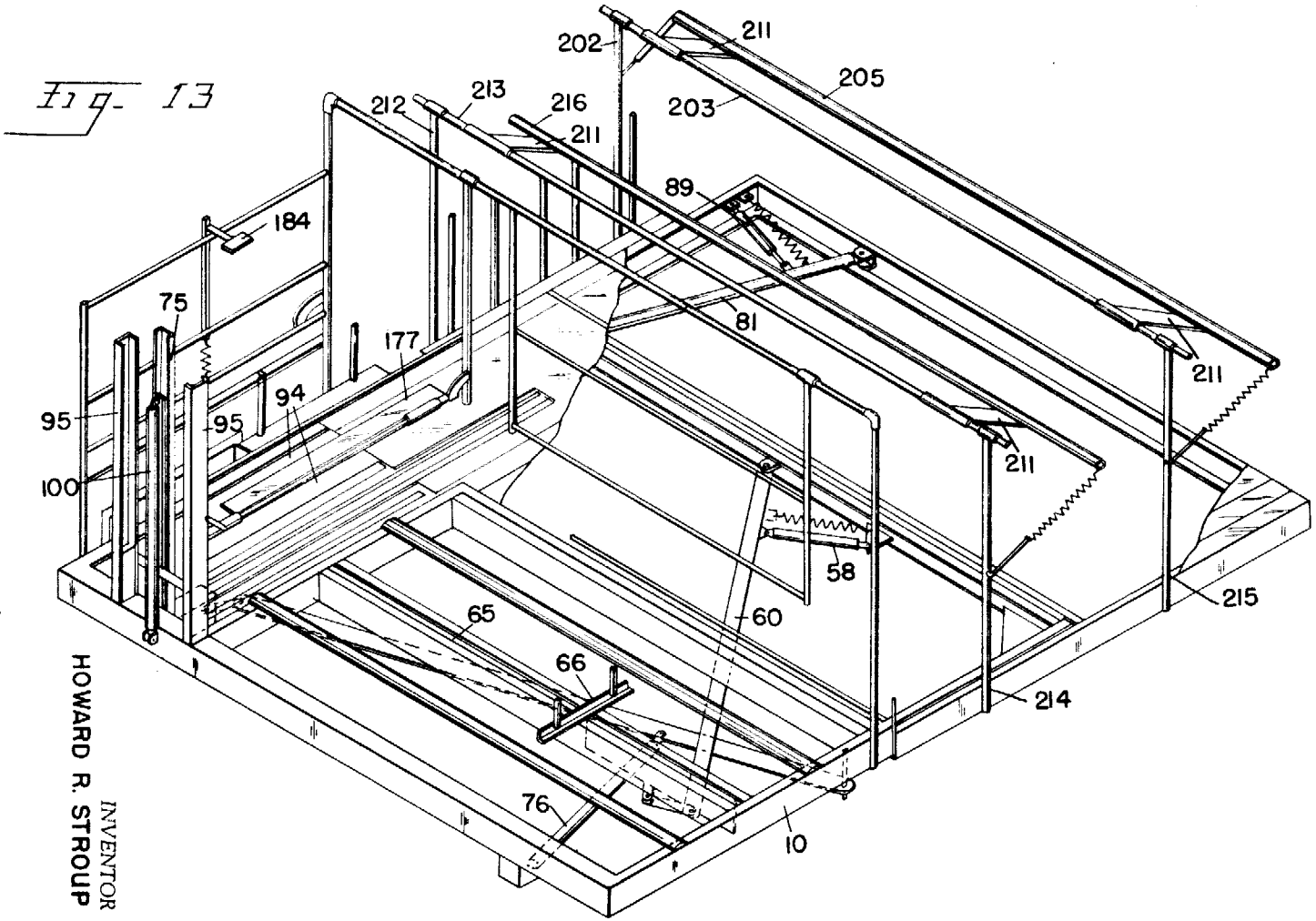
Figure 15:
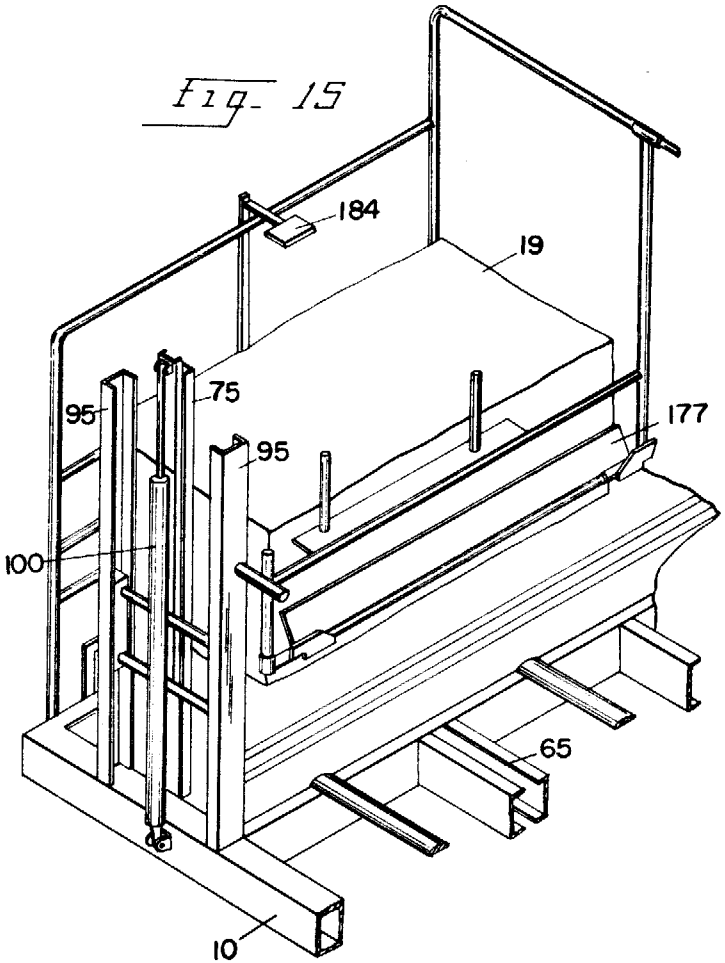
Figure 14:
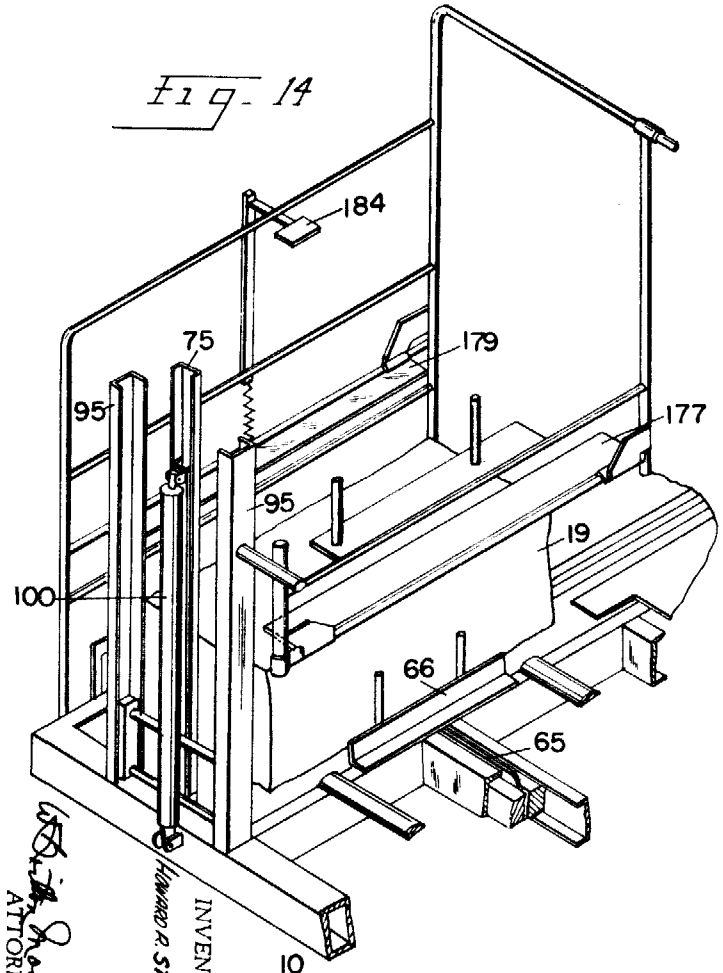
Figure 17:
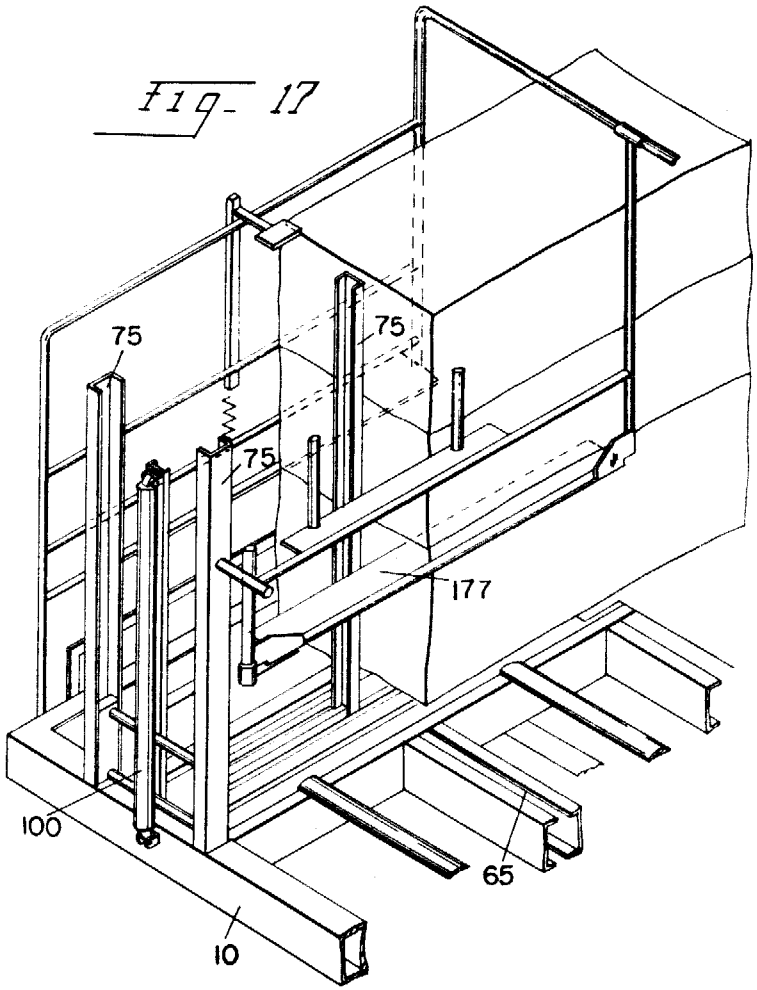
Figure 16:
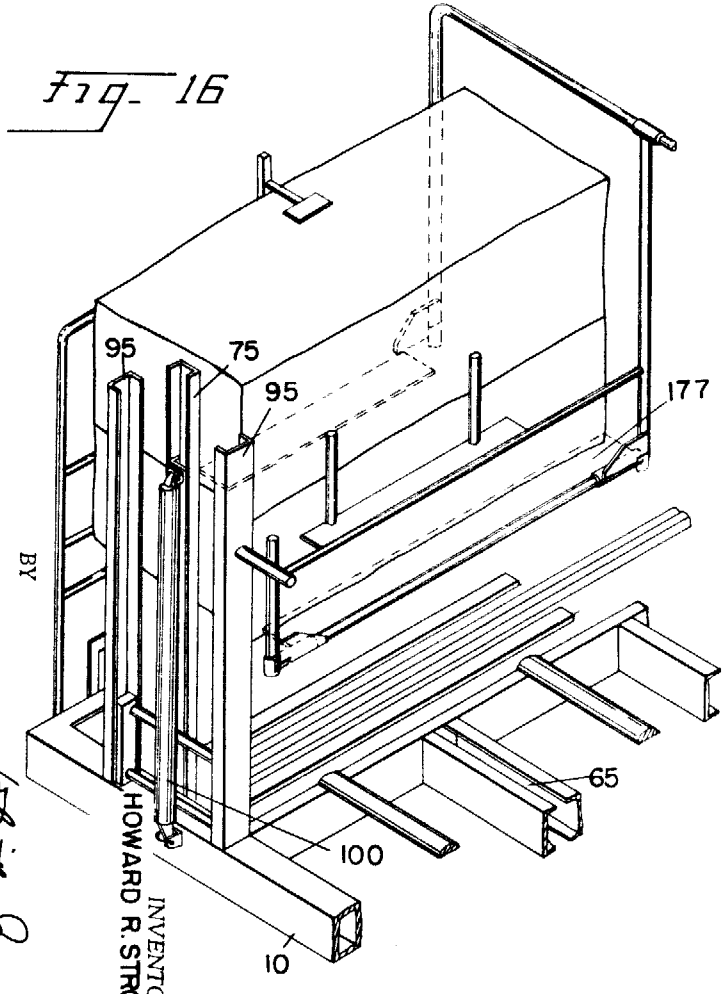
Figure 19:
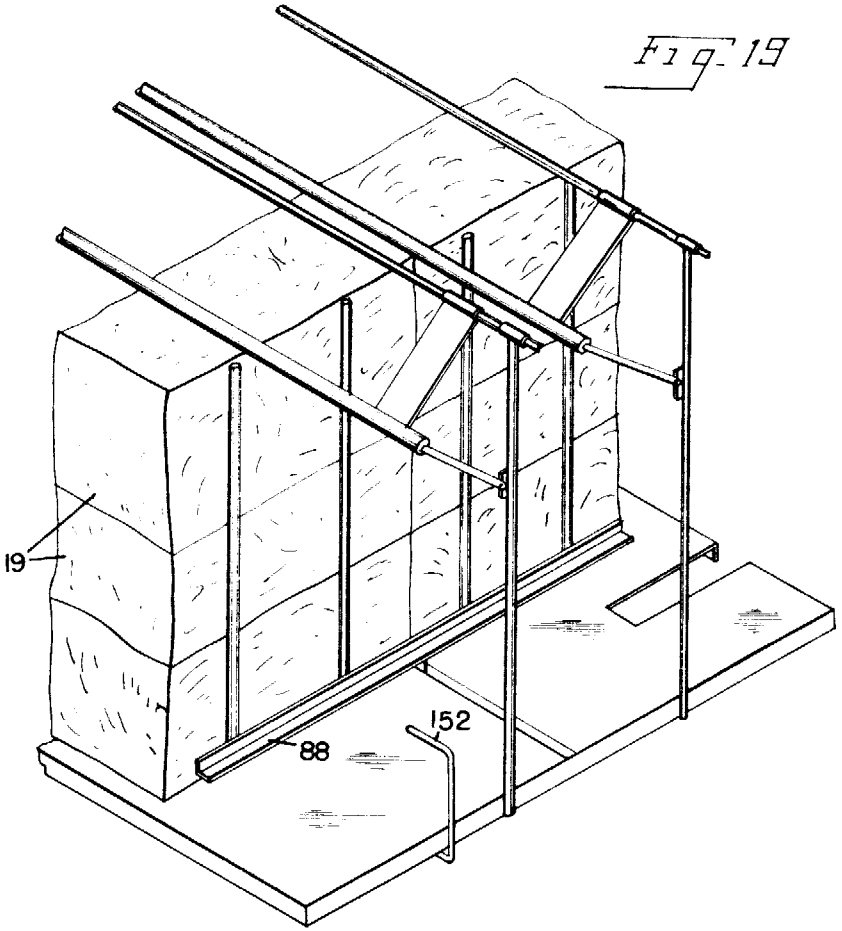
Figure 18:
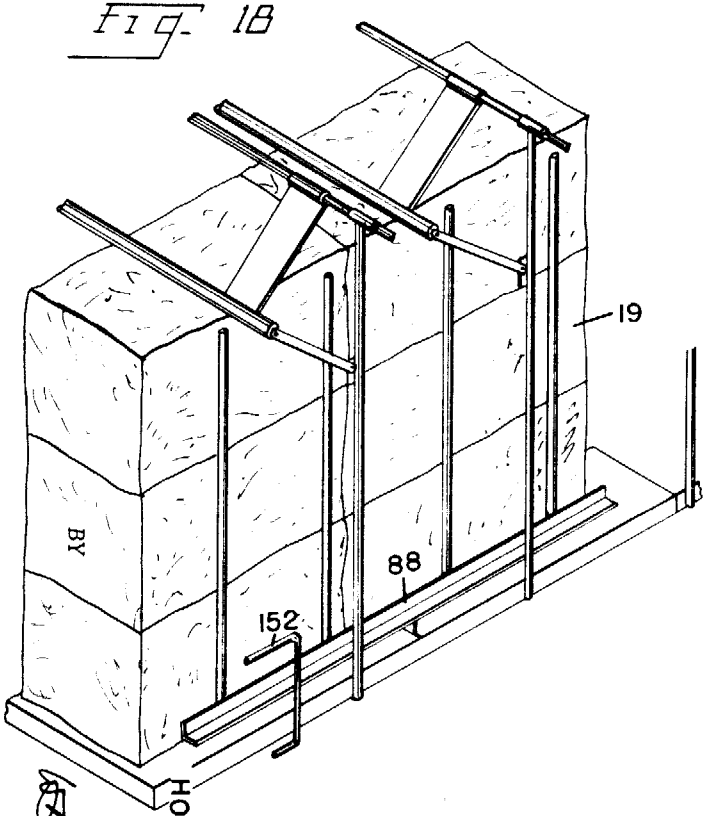
Figure 20:
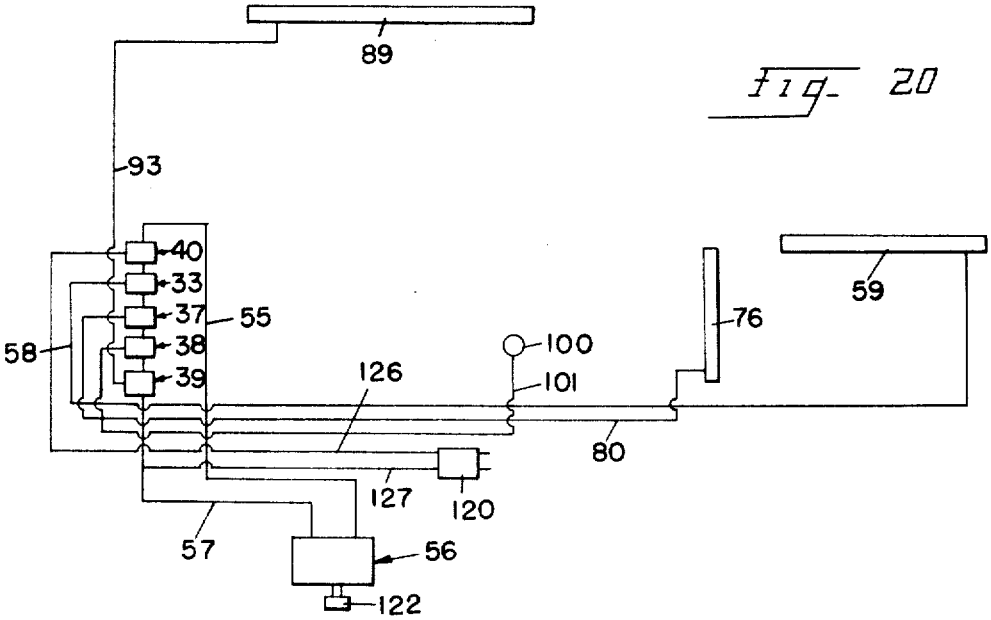
Figure 21:
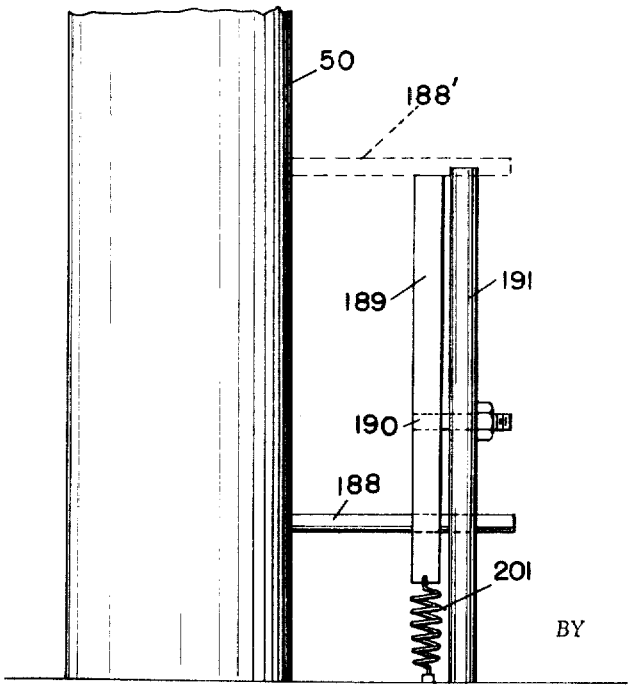

Other and further objects of the invention will become apparent from a reading of the following specification taken in conjunction with the drawings, in which:

FIGURE 1 is a side elevational view of an embodiment of the invention showing the same connected to a tractor drawn hay baling machine, FIGURE 2 is a view similar to FIGURE 1 but showing the apparatus of the present invention directly connected to a tractor, FIGURE 3 is an enlarged side elevational view of the apparatus of the present invention, FIGURE 4 is a front elevational view of FIGURE 3 taken substantially along line 4—4 thereof, FIGURE 5 is a plan view, partly broken away, of the apparatus illustrated in FIGURE 3, FIGURE 6 is a further enlarged fragmentary elevational view of FIGURE 3 illustrating certain details of construction, FIGURE 7 is a fragmentary sectional view taken substantially along line 7—7 of FIGURE 6, FIGURE 8 is an enlarged fragmentary sectional view, partly broken away, taken substantially along line 8—8 of FIGURE 6, FIGURE 9 is an enlarged fragmentary plan view, partly in section and partly broken away, of a portion of the apparatus shown in FIGURE 8, taken substantially along line 9—9 of FIGURE 8, FIGURE 10 is a fragmentary sectional view, partly broken away and taken substantially along line 10—10 of FIGURE 6, FIGURE 10a is a view similar to FIGURE 10 illustrating further details of the invention, FIGURE 11 is a fragmentary plan view illustrating a bale transfer mechanism forming a part of the apparatus, FIGURE 12 is a side elevational view of FIGURE 11 taken substantially along line 12—12 of FIGURE 11, FIGURE 13 is an isometric view, partly broken away, of the apparatus of the present invention, FIGURES 14 to 17, inclusive, are isometric views, partly broken away, of a stacking mechanism forming a part of the invention and illustrating various successive stages of the operation thereof, FIGURES 18 and 19 are fragmentary isometric views from the rear of the apparatus of the present invention shown in FIGURE 13 and illustrating successive movements of certain mechanisms contained therein, FIGURE 20 is a schematic view illustrating an hydraulic system forming a part of the invention, and FIGURE 21 is an enlarged fragmentary elevational view illustrating certain details of construction.

Referring more particularly to the drawings, there is shown therein a baled hay stacker, carrier and delivering apparatus comprising a platform 10 having a pair of supporting wheels 11 vertically pivoted thereto as indicated at 12, and a tiltable bed 10a horizontally pivoted at the rear of platform 10.

The forward end of the platform 10 (see FIGURE 5) is provided with a bolster 13 which is affixed thereto by means of a shaft 14 which is removably held in position by a pin 15. The bolster 13 is flanged and adapted to receive companion flanges (not shown) affixed to a hay baling machine generally designated at 16 (see FIGURE 1) or to a tractor generally designated at 17 (see FIGURE 2).

The hay baler 16 is provided with a discharge chamber 18 through which bales 19 are successively moved after they have been fabricated by the baler machine mechanism which is not shown since it forms no part of the present invention.

The platform 10 includes a pair of transversely extending space parallel cross bars 20 and 21.

A bell crank lever 22 is pivoted to the platform 10 as indicated at 23 with one arm in the path of bales 19 incoming from the baler chamber 18 while the other arm is connected to a spring 24 in turn connected to a rod 25 which is connected at 26 (FIGURE 6) to a rod 27, the rod 27 being affixed to a shaft 28. A lever 29 is likewise affixed to shaft 28 and is adapted upon proper rotation of the shaft 28 to bear against a lever 30 (FIGURES 6 and 7) which at one end has angularly affixed thereto an arm 31 the outer end of which is connected by a link 32 to the housing of a valve generally indicated at 33. A plunger 34 for actuating the valve 33 is centrally pivotally connected to the arm 31.

It will be seen in FIGURES 6 and 7 that the shaft 28 is mounted in journals 35 affixed to a vertical frame member 36 mounted at one side of the forward portion of the platform 10 and that the valve 33 is likewise mounted on the frame 36 as are valves 37, 38, 39 and 40.

A bracket 41 extends outwardly from the frame 36 and has pivoted to its outer end as indicated at 42, a hollow rod 43. A rod 44 is pivoted, as indicated at 45, to the free end of the lever 30 and is telescopically receivable in the rod 43. A collar 46 is affixed to the rod 44 and a collar 47 is adjustably mounted by means of a set screw 48 on the rod 43. A compression spring 49 bears at its ends against the collars 46 and 47 and surrounds the intervening portions of the rods 43 and 44.

A vertically extending shaft 50 is suitably journalled in the frame 36 and has affixed thereto a laterally extending lever 51. A laterally extending lever 52 is likewise affixed to the shaft 50. A laterally extending lever 52a having a dependent outer portion 53 is also affixed to the shaft 50 by means of a vertically adjustable collar portion 54.

Hydraulic fluid under pressure is supplied to the valves 40, 33, 37, 38 and 39 through a pipe 55 from an hydraulic pressure source generally indicated at 56 ad returned to said source through a common return pipe 57, it being understood that the hydraulic source 56 may be the conventional hydraulic system of the tractor 17 or an independent source suitably mounted on the platform 10 or elsewhere on the apparatus described herein.

The valve 33 is connected by a pipe 58 to an hydraulic jack 59 interconnecting the platform 10 and an elongated arm 60 which is pivoted, as indicated at 61, at one of its ends to the platform 10 and which is slotted at its other end, as shown at 62, to receive a pin 63 dependent from a guide 64 slidably mounted in a slot 65 provided between the members 20 and 21 and having affixed transversely thereof a pusher member 66. A tension spring [194] *200* interconnects the platform 10 and arm 60 in substantially parallel relation to the hydraulic jack 59. It will be apparent that the pusher member 66 is movable from its full line position in FIGURE 5 to the dotted line position indicated at 66' therein.

An elongated horizontal lever 67 is pivoted, as shown at 68 at one of its ends to the platform 10 and at its other end, as indicated at 69 to one end of a link 70 the other end of which is pivotally connected at 71 to an ear 72 affixed to a horizontal slide member 73 longitudinally slidable in a slot 74 in the platform and having affixed to its forward end a vertically extending pusher member 75 which is movable from its full line position shown in FIGURE 5 to its dotted line position indicated at 75' therein.

An hydraulic jack 76 is pivoted at one end, as shown at 77, to the arm 67 and at its other end to the platform 10 as shown at 78. A tension spring 79 interconnects the arm 67 with the platform whereby to return the arm from its dotted line position indicated at 67' to its full line position in the absence of pressure in the jack 76. A pipe 80 interconnects the valve 37 and the hydraulic jack 76.

A lever 81 is pivoted as shown at 82 to the rearward end of the titltable bed 10a at one of its ends and at its other end is pivoted, as shown at 83, to a link 84 which is, in turn, pivoted as shown at 85 to transverse guide members 86 mounted in guides 87 carried by the tiltable bed and having at its other end a vertically extending pusher member 88.

An hydraulic jack 89 is pivoted as shown at 90 at one of its ends to the tiltable bed 10a and at its other end, as shown at 91, to the lever 81 and a tension spring 92 interconnects the tiltable bed 10a with the lever 81 in substantial parallelism with the jack 89 whereby to move the lever 81 from its dotted line position indicated at 81' to its full line position in the absence of pressure in the jack 89.

A pipe 93 interconnects the jack 89 with the valve 39.

A fork lift is provided with a pair of horizontal lifting arms 94 and a pair of vertical arms 95 slidably mounted in a guideway 96 is provided and the arms 95 are connected at their upper ends with a cross piece 97 having forwardly extending ears 98 between which is pivoted a tongue 99 affixed to the upper end of an hydraulic jack 100 the lower end of which is connected to the platform 10. A pipe 101 connects the jack 100 to the valve 38.

A pickup attachment is shown generally at 102 (FIGURES 11 and 12) and consists of a downwardly and forwardly extending frame 103 having upwardly extending side rails 104 at each side thereof. An L-shaped bracket 105 is centrally provided with a rearwardly extending bolt 106 which is receivable in a block 107 mounted atop the rear end of the platform and is secured by a nut 108. Ears 109 at either side of the bracket 105 hingedly connect by means of pins 110 with the upper end of the frame 103. The forward end of the frame 103 is provided with a pair of divergent bale guide members 111 having ground-engaging skids 112 and upright side rails 104.

A transverse drive shaft 114 is journalled in the upper portion of the frame 103 and is centrally provided with a drive sprocket 115 while the lower portion of the frame is provided with a transverse idler shaft 116 having centrally located thereon an idler sprocket 117. A chain 118 having outwardly directed teeth or spikes 119 is entrained over the sprockets 115 and 117.

An hydraulic motor 120 is supported on the frame 103 by means of a bracket 121 and is operatively connected to the drive shaft 114 by a coupling 122.

A cross piece 123 is affixed to the underside of the frame 103 and is connected to the platform 10 by an hydraulic jack 124. A pipe 125 interconnects the jack 124 with a source of manually controlled hydraulic force (not shown) preferably mounted on the tractor 17.

The motor 120 is connected by a pipe 126 to the valve 40 and by a return pipe 127 to the pipe 97. The valve 40 is manually operated since the motor 120 need not be operated continuously and there is therefore no reason for draining pressure from the hydraulic system except as needed for actual operation of the motor 120 when it is desired to lift another bale in the pickup attachment 102.

Referring now to FIGURE 10, it will be seen that the lever 52 is adapted so that it can be brought to bear against a roller 128 which is mounted on a link 129 pivoted at 130 to a bell crank lever 131 pivoted as indicated at 132. The other arm of the bell crank 131 is pivoted to a link 133 which in turn is pivotally connected to a lever 134 which has at one end an angularly directed arm 135 connected by a link 136 to the housing of the valve 37 and which is adapted to bear against an actuating plunger 137 of said valve.

Pivoted as shown at 138 to a bracket 140 on the frame 36 is a hollow rod 139 having a collar 141 adjustably mounted thereon by means of a set screw 142. A rod 143 is pivoted at 144a to the free end of the lever 134 and affixed thereon is a collar 144. A compression spring 145 bears against the collars 141 and 144.

A guide arm 146 extends laterally downwardly and outwardly from the lower end of the pusher member 75 and is adapted, when the member 75 moves to its position at 75', to engage and move a rod 147 connected to a link 148 which, in turn, is pivoted at 149 and such movement is calculated to return the various linkage shown in FIGURE 10 to the solid line position shown therein.

The operating mechanism for the valves 38 and 39 are indicated at 150 and 151 and are substantially identical with that above described with reference to valve 37 and need not be further shown or described herein.

Referring now to FIGURE 10a, it will be seen that lever 52 is adapted so that it can be brought to bear against a roller 192 which is mounted on a link 193 pivoted at 194 to a bell crank 195 pivoted as indicated at 196. The other arm of the bell crank 195 is pivoted to a link 197 which is pivotally connected to a lever 198 which causes the operation of valve 38 in the manner heretofore described with reference to valve 37.

A free arm 181 which is pivoted upon a vertically adjustable collar 182 on the frame 36 extends into the path of horizontal lifting arms 94 and is connected to link 193 by means of linkage 199.

A horizontal arm 184 is affixed to the upper end of a vertical shaft 185 vertically slidable in a packet 186 affixed to the frame 36 and the lower end of the shaft 185 is connected by a spring 187 to the upper end of the shaft 50. A pin 188 (see FIGURE 21) extends laterally from the shaft 50 and is engageable with a latch 189 which is pivoted as indicated at 190 to a bracket 191 carried by the adjacent framework 36.

A bell crank having a free arm 152 is pivoted, as indicated at 153 and its other arm 154 is connected by a spring 155 to a cable 156 which runs through guide eye 156a and is in turn connected to linkage 157a which is pivoted at 157b, pivoted at 157c is a free arm 157 which rests upon spring 158 bearing against collar 158b which is secured to shaft 158 by means of set screw 158c. Shaft 158 is connected by linkage 159, 160, 161 and 162 to a lever 163 which causes the operation of valve 39 in the manner heretofore described with reference to valve 37.

A lever 164 is pivoted at 165 to the platform 10 as shown at 165 and its free end is connected by a tension spring 166 to a cable 167 which passes through an eye 168 at one side of the platform and is eventually connected to the linkage 159 etc.

A lever 169 is connected by linkage 170 which is connected by a ball joint 171 to a lever 172 affixed to a shaft 173 to which is also affixed a pair of hooks 174 engaging normally under a portion of the platform 10.

A stacking chamber is generally indicated at 175 in FIGURE 4 and is defined on one side by the frame 36 and on the other by a fence 176. A trap door 177 extends inwardly from a collar 178 vertically adjustably mounted on the fence 176 and a trap door 179 extends inwardly into the chamber 175 from a collar 180 vertically adjustable upon the frame 36.

The trap doors 179 and 177 normally are in a horizontal position extending toward each other but are so constructed that they may be lifted to vertical positions as by, for example, a bale 19 moving upwardly in the stacking chamber 175 and abutting against them.

It will be also noted that securely fastened to tiltable bed 10a outside of the area, to the right and left, that is occupied by staked bales there are two pairs of vertical supports 202 and 215, and 212 and 214 upon which are fastened two horizontally and laterally placed shafts 203 and 213, respectively. Rearwardly and downwardly pivotally suspended from the shafts 203 and 213 by means of brackets 210 and a hollow shaft 207 which slides over rod 209 and is held in place by the adjustable collar 208 and spring 206, are the horizontally and vertically suspended hold-down members 205 and 216. It can be readily seen that the height of the hold-down members above the tiltable bed is flexible due to the hollow shaft 207 sliding over rod 209 restrained only by the tension of spring 206 and adjustable by moving collar 208 on rod 209.

It will be apparent that the apparatus of the present invention may be attached to the baler 16 directly by means of the bolster 13 merely by utilizing the pin 15 in conventional manner. When it is desired to pull the apparatus of the present invention directly by a tractor, the bolster may be moved to a position adjacent the area 175, as in FIGURE 5 whereupon the mechanism shown in FIGURES 12 and 11 may be attached to the conventional position of bolster 13 for direct delivery of bales 19 to that area. The bolster will allow freedom of movement of the machine of the present invention with respect to either the baler or tractor 17.

It will be appreciated that the pressure source 56 (see FIGURE 20) may be mounted upon the hay baler 16 and powered by the baler engine or pressure may be obtained from the hydraulic system of the tractor pulling the baler. Pressure is transmitted from the source 56 to the valves 40, 33, 37, 38 and 39 by means of the pipe 55 and returned to the source 56 by means of the pipe 57. The control valves are of any suitable type wherein hydraulic pressure is applied to individual cylinders or wherein the release of pressure allows the fluid to flow through the pipe 57.

With the apparatus in operation, it will be seen that bales 19 from the hay baler 16 will discharge upon the platform 10 and that the next bale wil move the first bale until the first bale comes into contact with [he] *the* lever 22 thus moving the spring 24 and rod 25 which, in turn, is connected to lever 27 (see FIGURE 6) which will rotate the shaft 28 thus causing the lever 30 (see FIGURE 7) to break over center from the full line to the dotted line position shown therein. This will cause actuation of the valve 33 by means of the arm 31 bearing against the actuating member 34 thus causing fluid under pressure to be transmitted by means of the pipe 58 to the cylinder 59 (see FIGURE 5). This expansion in the jack 59 will cause, through the arm 60, a movement of the pressure member 66 in a downward direction as viewed in FIGURE 5 thus moving the bale to the right hand corner of the apparatus shown in that figure or to the area designated at 175 in, for example, FIGURE 4.

This action will cause the bale to come into contact with the lever 51 which will turn the shaft 50 and consequently the lever 52 which bears against roller 192 (see FIGURE 10a) At the same time the shaft 50 will move lever 52a (FIGURE 6) against lever 30 to cause the valve mechanism illustrated in FIGURE 7 to break back again over center to its full line position thus allowing the valve 33 to release pressure from the cylinder 59 allowing the spring 200 to return the pusher member 66 to its original position shown in full lines in FIGURE 5. The roller 192 moves linkage 193, 195, 197 and 199 causing the lever 198 to break over center to operate valve 38 thus directing hydraulic pressure by means of pipe 101 to the cylinder 100 (FIGURE 3) which raises the fork members 94 (FIGURE 5) upwardly thus lifting the first bale through the trap doors 177 and 179 and striking lever 181 thus moving the cable 183 upwardly thus moving bell crank 129 which moves linkages 199 to move the links 193, 195 and 197 to thus move the lever 198 causing valve 38 to release the pressure to the cylinder 100 allowing the weight of the fork 94 to return the latter to its original lowered position. The first bale is then held aloft by the trap doors 177 and 179 with sufficient room therebelow for the reception of the next bale.

The second bale is then pushed by the third bale against the lever 22 thus starting the cycle again which proceeds as above described until the second bale is lifted by the fork 94. The fork then raises the second bale through the trap doors 177 and 179 and the uppermost of first bale will then come into contact with the lever 184 which lifts the shaft 50 upwardly. The shaft 50 is then held in this upward position by the pin 188 resting upon the latch 189 (see FIGURES 8 and 21) so that the third bale will move the roller 128. A spring 201 allows the pin 188 to pass the latch 189 when the shaft 50 is moved upwardly. The pusher member 66 is then returned again to its original position and the third bale is then pushed by the fourth bale against the lever 22 again starting the cycle above referred to which cycle proceeds as described above except that the third bale encounters lever 51 which turns the shaft 50 which is now in an upward position and moves its connected linkage to cause a lever 134 to break over center allowing the valve 37 to direct hydraulic pressure through the pipe 80 to the cylinder 76 (which moves the linkage 67, 70), to thus cause a rearward movement of the pusher member 75 which thus moves the three vertically assembled bales of hay away from the fork 94 and trap doors 177 and 179 onto the tilt-bed portion of the apparatus. When the plunger or pusher member 75 has moved to its extended position as shown at 75′ in FIGURE 5, the guide arm 146 which is attached thereto moves the rod 147 to cause the linkage 148, etc. (FIGURE 10) to cause the valve operating mechanism of valve 37 to again move over center to release the hydraulic pressure to the cylinder 74 and allow the spring 79 to move the plunger 75 back to its original position.

It will be noted that when the first bale engages the lever 184 to raise the shaft 50 into its upward position, that the bale lowers after the trap doors are closed thus allowing the lever 184 to return to its lower position. When the third bale actuates the cylinder 75, it turns the shaft 50 causing the pin 188 to be released from the latch 189 thus allowing the shaft 50 to return to its lowered position.

The above-noted procedure is repeated until the plunger 75 has moved rearwardly six bales (in two stacks of three bales each). As the rearmost stack of three bales moves toward its most rearward position, the bottom bale thereof will move the lever 152 through spring 155 and cable 156 which runs through guide eye 156a to lower free arm 157 into the path of guide arm 146. Guide arm 146 when carried to its original position with plunger 75 will strike and move forwardly free arm 157 which is pivoted at 157a, free arm 157 will push against spring 158a moving shaft 158 causing through linkage 159, 160, 161 and 162 to break the lever 163 over center causing valve 39 to direct pressure through pipe 93 to the cylinder 89 which, in turn, moves the lever 81 and its associated linkage to cause the plunger 88 to move the six thus assembled bales across the tilt bed far enough to allow room for six additional bales. This causes the lever 81 to move lever 164 which is connected by spring 166 and cable 167 passing through eye 168 to move the linkage 159 and 160 to thereby move the lever 163 causing valve 39 to release the hydraulic pressure to the cylinder 89 thus allowing the spring 92 to return the plunger 88 to its original position.

This over-all process is continued until twenty-four bales have been stacked upon the tilt-bed. The cylinder 89 will then start its cycle of moving the load crosswise of the tilt-bed whereupon the bales nearest the lever 169 will encounter the latter which is connected by linkage 170, 171, etc. thereby turning the shaft 173 in a clockwise direction as viewed in FIGURE 3 to release the latches 174 from engagement with the nearby structure and allowing the tilt-bed to tilt to its dotted line position shown in FIGURE 3 to thereby discharge the entire load from the tilt-bed, the bed being returned to the horizontal position as soon as released by the weight of the bales thereon.

When the forward portion of the tilt bed rises, it will cause the cable guide 168 to tighten the cable 167 thus moving linkage 159, 160, 161 and 162 to cause the valve actuating mechanism for valve 39 to break over center thereby releasing the hydraulic pressure to the cylinder 89 thereby allowing the spring 92 to return the plunger 88 to its original position without going through its respective cycle.

As previously stated, the apparatus may be operated direct-behind and connected to a tractor. By moving the bolster to a position adjacent to the area 175, the machine may be readily attached to a tractor. The pickup attachment shown in FIGURES 11 and 12 may then be fastened to the machine at the conventional position of bolster 13 as shown, for example, in FIGURE 5. The hydraulic system of the pickup attachment and the remainder of the apparatus is then attached to the tractor system. The hydraulic motor 120 is controlled manually by operating the valve 40 which allows pressure to be applied by the pipe 126 and to be returned through the pipes 127 and 57. The hydraulic motor 120 is operated manually so that it will not take pressure away from the remainder of the apparatus if it were allowed to operate continuously. Moreover, it makes it possible for the tractor operator to control the travel of the bales so that the bale on the pickup will push the bale that is already on the platform 10 against the lever 22.

With reference to the pickup device illustrated in FIGURES 11 and 12, it will be seen that the cylinder 124 is connected directly to a control valve (not shown) on the tractor by means of a pipe 125 and may be operated to lift the pickup attachment over obstacles or when the machine is being transported from place to place. The hydraulic motor 120, when pressure is applied thereto, turns the shaft 114 which drives the spiked chain 118 so that the upper flight thereof moves in an upward direction to thus grasp the bales 19 and lift them to the platform 10, the rails 104 acting to prevent accidental dropping of the bales to either side of the device and the members 111 acting to guide bales toward the spiked chain 118.

It may be stated that in the operation of this machine, the breakover-center method of controlling the valves 33, 37, 38 and 39 makes for very positive action and eliminates the necessity for extremely accurate trip controls. It has been found in practice that the cylinder 59 requires less hydraulic pressure to function than cylinders 76 or 100 and that therefore the cylinder 59 will complete its function before the cylinders 89 or 76 start their functions, thereby eliminating the need for extremely fine adjustment in the charging of pressure from cylinder 59 to either of the other named cylinders.

It will be understood that the foregoing description shows and describes an apparatus handling twenty-four bales but that it should not be limited thereto and may be constructed to handle a greater or lesser number as required.

It will also be noted that the fence 176 is so mounted that it may be adjusted inwardly or outwardly with respect to the frame 36 to compensate for bales of different sizes which may be received from different baler mechanisms. The trap doors 177 and 179 may be raised or lowered for the same reason.

The concept of the present invention should not be limited to an apparatus mounted upon caster wheels as shown as it is intended to apply the invention to self-propelled models as well as models that may be moved as conventional trailers.

While but one form of the invention has been shown and described herein, it will be readily apparent to those skilled in the art that many minor modifications may be made without departing from the sirit of the invention or the scope of the appended claims.

What is claimed is:

1. An apparatus of the character described comprising a horizontal wheeled platform, a tilt-bed pivotally connected to the rear end portion of said platform, means for delivering bales singly to said platform, means forming a stacking chamber on said platform, automatic means for moving said bales singly to said chamber, automatic means for vertically stacking a given number of said bales as received in said chamber, automatic means for moving said stacks rearwardly to said tilt-bed to form a row of said stacks thereon, and automatic means for moving said completed rows laterally upon said tilt-bed to fill the same, said automatic means for moving said bales singly to said chamber including a laterally movable pusher member, hydraulic means for moving said pusher member toward said chamber, a valve controlling said hydraulic means, a lever on said platform in the path of delivery of said bales to said platform for actuating said valve, automatic means for releasing said valve upon delivery of said bale to said chamber, and a spring for returning said pusher member to its original position.

2. An apparatus of the character described comprising a horizontal wheeled platform, a tilt-bed pivotally connected to the rear end portion of said platform, means for delivering bales singly to said platform, means forming a stacking chamber on said platform, automatic means for moving said bales singly to said chamber, automatic means for vertically stacking a given number of said bales as received in said chamber, automatic means for moving said stacks rearwardly to said tilt-bed to form a row of said stacks thereon, automatic means for moving said completed rows laterally upon said tilt-bed to fill the same, latching means maintaining said tilt-bed in horizontal position, and automatic means actuated by complete loading of said tilt-bed for releasing said latch means whereby said tilt-bed will automatically unload by gravity, wherein said automatic means for moving said bales singly to said chamber includes a laterally movable pusher member, hydraulic means for moving said pusher member toward said chamber, a valve controlling said hydraulic means, a lever on said platform in the path of delivery of said bales to said platform for actuating said valve, automatic means for releasing said valve upon delivery of said bale to said chamber, and a spring for returning said pusher member to its original position.

3. An apparatus of the character described comprising a horizontal wheeled platform, a tilt-bed pivotally connected to the rear end portion of said platform, means for delivering bales singly to said platform, means forming a stacking chamber on said platform, automatic means for moving said bales singly to said chamber, automatic means for vertically stacking a given number of said bales as received in said chamber, automatic means for moving said stacks rearwardly to said tilt-bed to form a row of said stacks thereon, and automatic means for moving said completed rows laterally upon said tilt-bed to fill the same, said automatic means for vertically stacking a given number of bales as received in said chamber comprising an inwardly directed normally horizontal upwardly swingable trap door on each side of said chamber, a fork lift normally positioned in the bottom of said chamber, hydrauic means for moving said fork lift upwardly in said chamber, a valve for actuating said hydraulic means, a first lever in said chamber operable upon contact with a bale placed therein to actuate said valve, a second lever in the vertical path of said bales in said chamber for deactivating said valve after a bale has passed said trap doors whereby said lift may lower by gravity, a third lever atop said chamber in the vertical path of said bales, and means operable by said third lever for moving a stack of bales from said chamber.

4. An apparatus of the character described comprising a horizontal wheeled platform, a tilt-bed pivotally connected to the rear end portion of said platform, means for delivering bales singly to said platform, means forming a stacking chamber on said platform, automatic means for moving said bales singly to said chamber, automatic means for vertically stacking a given number of said bales as received in said chamber, automatic means for moving said stacks rearwardly to said tilt-bed to form a row of said stacks thereon, and automatic means for moving said completed rows laterally upon said tilt-bed to fill the same, said automatic means for vertically stacking a given number of bales as received in said chamber comprising an inwardly directed normally horizontal upwardly swingable trap door on each side of said chamber, a fork lift normally positioned in the bottom of said chamber, hydraulic means for moving said fork lift upwardly in said chamber, a valve for actuating said hydraulic means, a first lever in said chamber operable upon contact with a bale placed therein to actuate said valve, a second lever in the vertical path of said bales in said chamber for deactivating said valve after a bale has passed said trap doors whereby said lift may lower by gravity, a third lever atop said chamber in the vertical path of said bales, and means operable by said third lever for moving a stack of bales from said chamber, said first and third lever for actuating and deactivating said valve having an over-center connection with said valve.

5. An apparatus of the character described comprising a horizontal wheeled platform, a tilt-bed pivotally connected to the rear end portion of said platform, means for delivering bales singly to said platform, means forming a stacking chamber on said platform, automatic means for moving said bales singly to said chamber, automatic means for vertically stacking a given number of said bales as received in said chamber, automatic means for moving said stacks rearwardly to said tilt-bed to form a row of said stacks thereon, automatic means for moving said completed rows laterally upon said tilt-bed to fill the same, latching means maintaining said tilt-bed in horizontal position, and automatic means actuated by complete loading of said tilt-bed for releasing said latch means whereby said tilt-bed will automatically unload by gravity, said automatic means for vertically stacking a given number of bales as received in said chamber comprising an inwardly directed normally horizontal upwardly swingable trap door on each side of said chamber, a fork lift normally positioned in the bottom of said chamber, hydraulic means for moving said fork lift upwardly in said chamber, a valve for actuating said hydraulic means, a first lever in said chamber operable upon contact with a bale placed therein to actuate said valve, a second lever in the vertical path of said bales in said chamber for deactivating said valve after a bale has passed said trap doors whereby said lift may lower by gravity, a third lever atop said chamber in the vertical path of said bales, and means operable by said third lever for moving a stack of bales from said chamber.

6. An apparatus of the character described comprising a horizontal wheeled platform, a tilt-bed pivotally connected to the rear end portion of said platform, means for delivering bales singly to said platform, means forming a stacking chamber on said platform, automatic means for moving said bales singly to said chamber, automatic means for vertically stacking a given number of said bales as received in said chamber, automatic means for moving said stacks rearwardly to said tilt-bed to form a row of said stacks thereon, automatic means for moving said completed rows laterally upon said tilt-bed to fill the same, latching means maintaining said tilt-bed in horizontal position, and automatic means actuated by complete loading of said tilt-bed for releasing said latch means whereby said tilt-bed will automatically unload by gravity, said automatic means for vertically stacking a given number of bales as received in said chamber comprising an inwardly directed normally horizontal upwardly swingable trap door on each side of said chamber, a fork lift normally positioned in the bottom of said chamber, hydraulic means for moving said fork lift upwardly in said chamber, a valve for actuating said hydraulic means, a first lever in said chamber operable upon contact with a bale placed therein to actuate said valve, a second lever in the vertical path of said bales in said chamber for deactivating said valve after a bale has passed said trap doors whereby said lift may lower by gravity, a third lever atop said chamber in the vertical path of said bales, and means operable by said third lever for moving a stack of bales from said chamber, said first and third lever for actuating and deactivating said valve having an over-center connection with said valve.

7. An apparatus of the character described comprising a horizontal wheeled platform, a tilt-bed pivotally connected to the rear end portion of said platform, means for delivering bales singly to said platform, means forming a stacking chamber on said platform, automatic means for moving said bales singly to said chamber, automatic means for vertically stacking a given number of said bales as received in said chamber, automatic means for moving said stacks rearwardly to said tilt-bed to form a row of said stacks thereon, automatic means for moving said completed rows laterally upon said tilt-bed to fill the same, latching means maintaining said tilt-bed in horizontal position, and automatic means actuated by complete loading of said tilt-bed for releasing said latch means whereby said tilt-bed will automatically unload by gravity, said automatic means for vertically stacking a given number of bales as received in said chamber comprising an inwardly directed normally horizontal upwardly swingable trap door on each side of said chamber, a fork lift normally positioned in the bottom of said chamber, hydraulic means for moving said fork lift upwardly in said chamber, a valve for actuating said hydraulic means, a first lever in said chamber operable upon contact with a bale placed therein to actuate said valve, a second lever in the vertical path of said bales in said chamber for deactivating said valve after a bale has passed said trap doors whereby said lift may lower by gravity, a third lever atop said chamber in the vertical path of said bales, and means operable by said third lever for moving a stack of bales from said chamber and said automatic means for moving said stacks rearwardly to said tilt-bed to form a row of stacks thereon including a vertically extending pusher member, hydraulic means for moving said pusher member rearwardly on to said bed, a valve for actuating said hydraulic means, a lever associated with said stacking chamber for actuating said last-mentioned lever, a further lever in the path of said pusher member for deactivating said valve, and a spring for returning said pusher member to its original position.

8. An apparatus of the character described comprising a horizontal wheeled platform, a tilt-bed pivotally connected to the rear end portion of said platform, means for delivering bales singly to said platform, means forming a stacking chamber on said platform, automatic means for moving said bales singly to said chamber, automatic means for vertically stacking a given number of said bales as received in said chamber, automatic means for moving said stacks rearwardly to said tilt-bed to form a row of said stacks thereon, automatic means for moving said completed rows laterally upon said tilt-bed to fill the same, latching means maintaining said tilt-bed in horizontal position, and automatic means actuated by complete loading of said tilt-bed for releasing said latch means whereby said tilt-bed will automatically unload by gravity, said automatic means for vertically stacking a given number of bales as received in said chamber comprising an inwardly directed normally horizontal upwardly swingable trap door on each side of said chamber, a fork lift normally positioned in the bottom of said chamber, hydraulic means for moving said fork lift upwardly in said chamber, a valve for actuating said hydraulic means, a first lever in said chamber operable upon contact with a bale placed therein to actuate said valve, a second lever in the vertical path of said bales in said chamber for deactivating said valve after a bale has passed said trap doors whereby said lift may lower by gravity, a third lever atop said chamber in the vertical path of said bales, and means operable by said third lever for moving a stack of bales from said chamber, and said automatic means for moving said stacks rearwardly to said tilt-bed to form a row of stacks thereon including a vertically extending pusher member, hydraulic means for moving said pusher member forwardly onto said bed, a valve for actuating said hydraulic means, a lever associated with said stacking chamber for actuating said last-mentioned lever, a further lever in the path of said pusher member for deactivating said valve, and a spring for returning said pusher member to its original position, said lever associated with said stacking chamber and said further lever having an over-center connection with said valve.

*9. In combination, a mobile hay baler adapted to travel in a forward direction and having a fore-and-aft extending bale chamber, said chamber having a horizontal bottom over which bales slide and emerge rearwardly from the baler, a bale stacker towed by and behind said baler and having a bale receiving platform disposed directly behind said bale chamber, wheels on said platform supporting the platform at a height to receive bales thereon after they emerge successively rearwardly from said baler, bolster means extending between said bale chamber bottom and said receiving platform, said bolster means constituting a rearward extension from said chamber bottom and a forward extension from said platform and supporting bales moving rearwardly from said chamber to said platform, means on said platform offset laterally from said bolster means for engaging successive bales received thereon and forming a plurality of bales in a vertical stack, one bale on top of the other, and in direct engagement with each other, means on said platform directly behind said bolster means for moving each bale as received thereon laterally into said stacking means, means on said platform for moving completed stacks rearwardly from said stacking means and forming an orderly plurality of bale stacks one against the other on said stacker, and means for discharging said plural stacks from said stacker onto the ground after the stacker has been filled with bales.*

*10. In combination with a hay baler having a fore-and-aft extending bale chamber from which bales are successively discharged rearwardly at the completion of their formation, a generally horizontal platform having front and rear ends and lateral sides, wheels on said platform supporting the platform for movement forwardly over the ground with said lateral sides extending in the direction of travel, means on said platform forming a bale stacking chamber at said front end of the platform adjacent one of said lateral sides, means on said platform at said front end thereof between said stacking chamber and the other of said lateral sides for receiving bales and moving said bales singly laterally into said stacking chamber, automatic means for vertically stacking a given number of bales as received in said chamber, means for moving stacks of bales rearwardly from said stacking chamber automatically at the completion of a stack, means coupling said platform behind said hay baler with said stack-*

*ing chamber laterally offset from said bale forming chamber and said bale receiving and lateral moving means disposed directly behind said bale chamber, and bale supporting means extending rearwardly from said bale chamber to said platform whereby each successive bale discharged rearwardly from said bale chamber moves onto the receiving and lateral moving means on said platform.*

*11. In combination with a hay baler having a fore-and-aft extending bale forming chamber wherein hay or like material is formed into bales, said bale chamber having a horizontal bottom wall disposed a given distance above the ground and over which bales are successively discharged horizontally rearwardly at the completion of their formation, a generally horizontal platform having front and rear ends and lateral sides, wheels on said platform supporting the platform substantially said given distance above the ground for movement forwardly over the ground, a tilt bed pivotally connected to said platform and disposed behind said rear end of the platform, means on said platform forming a bale stacking chamber at said front end of the platform adjacent one of said sides, means on said platform at said front end thereof between said stacking chamber and the other of said lateral sides for receiving single bales beside said stacking chamber and moving them laterally into said chamber, control means operating said lateral moving means automatically in response to the reception thereon of a bale in lateral alignment with said stacking chamber, means for vertically stacking a given number of bales as received in said chamber, control means in said chamber actuating said stacking means automatically in response to the reception of a bale in said chamber, means for moving stacks of bales rearwardly from said stacking chamber to said tilt bed control means actuating said rearward stack moving means automatically in response to the formation of a stack of predetermined height in said chamber, means for moving completed rows of stacks laterally upon said tilt bed to fill the same, control means actuating said lateral row moving means automatically in response to the completion of a row of stack along one side of said tilt bed, and means coupling said platform behind said hay baler with said stacking chamber laterally offset from said bale froming chamber and said bale receiving and lateral moving means disposed directly behind said bale chamber in position to operatively receive each bale after it is discharged rearwardly from said baler.*

*12. The combination recited in claim 11 wherein said means for moving bales singly into said chamber is disposed immediately behind said front end of said platform, said coupling means connecting said platform to said baler with said front end immediately behind the rear end of said bale chamber bottom wall and providing a generally horizontal fore-and-aft extending axis about which said platform may rock laterally relative to said bale chamber upon movement of said baler and platform over uneven ground, and wherein the wheels on said platform are caster wheels to facilitate the execution of turns without disrupting the fore-and-aft alignment relationship between said platform and said bale chamber.*

*13. Baled hay receiving, stacking and carrying apparatus comprising a frame connectable to a vehicle to be towed around a field for receiving hay bales, bale receiving means, bale stacking means and a bale carrying bed all mounted on said frame, said bale receiving means having a conveyor for moving bales one at a time across the receiving means and depositing each bale in said bale stacking means, said bale stacking means comprising a stacking chamber, at least one lift arm normally in the bottom of said chamber and on top of which bales are discharged from said conveyor, means for elevating said lift arm to thereby move a deposited bale upwardly in said chamber a distance greater than the height of the bale, trap door means having an extended position in the path of an elevated bale and moved out of said path to a retracted position by the bale when the bale passes and said trap door means then returning to said extended position, said lift arm when lowered depositing a lifted bale on said trap door means, means for cyclically operating said stacking means to arrange a plurality of bales within said chamber one on top of the other on said trap door means and one bale beneath the trap door means, and a pusher means for said stack engageable with the one bale beneath said trap door means and at least one bale above the trap door means and operable across said chamber to move the stack from the chamber and onto said bale carrying bed.*

*14. Baled hay receiving, stacking and carrying apparatus as recited in claim 13 wherein a lever extends into said chamber for engagement by each bale discharged from said conveyor and moved thereby to actuate said lift arm elevating means.*

*15. Baled hay receiving, stacking and carrying apparatus as recited in claim 13 where said pusher means comprises a vertically extending pusher member of such length and so located that it engages each bale in a completed stack in said chamber.*

*16. In combination, a mobile hay baler adapted to travel in a forward direction and having a fore-and-aft extending bale chamber, said chamber being rectangular in cross-section and having a horizontal top and bottom spaced apart vertically and between which bales slide and emerge rearwardly from the baler, a bale stacker towed by and behind baler and having a bale receiving platform disposed directly behind said bale chamber and in a horizontal plane forming generally a continuation of said bottom wall of said chamber, wheels on said platform supporting the platform at a height to receive bales thereon after they emerge successively rearwardly from said baler, bolster means extending between said bale chamber bottom and said receiving platform, said bolster means constituting a rearward extension from said chamber bottom and a forward extension from said platform and supporting bales moving rearwardly from said chamber to said platform, means on said platform for engaging successive bales received thereon and forming a plurality of bales in a vertical stack one bale on top of the other and in direct engagement with each other, said stacker means comprising means for raising and supporting a given bale vertically above said platform a distance at least equal to the vertical spacing between said top and bottom of said bale chamber and means on said platform for positioning the next discharged bale to be stacked beneath said given bale, means on said platform for moving completed stacks from said stacking means and forming an orderly plurality of bale stacks one against the other on said stacker, and means for discharging said plural stacks from said stacker onto the ground.*

References Cited

The following references, cited by the Examiner, are of record in the patented file of this patent or the original patent.

UNITED STATES PATENTS

| | | | |
|---|---|---|---|
| 1,292,636 | 1/1919 | Parker | 214—6 |
| 2,702,131 | 2/1955 | Leupke | 214—6 |
| 2,728,601 | 12/1955 | Quigley | 214—42 |
| 2,924,051 | 2/1960 | More | 214—6 |
| 3,092,272 | 6/1963 | Weigel | 214—501 |
| 3,139,196 | 6/1964 | Legocki | 214—6 |
| 3,163,302 | 12/1964 | Pridgeon | 214—6 |

GERALD M. FORLENZA, *Primary Examiner.*

F. E. WERNER, *Assistant Examiner.*